(12) United States Patent
Lee et al.

(10) Patent No.: US 11,270,672 B1
(45) Date of Patent: Mar. 8, 2022

(54) DISPLAY OF VIRTUAL ASSISTANT IN AUGMENTED REALITY

(71) Applicant: Microsoft Technology Licensing, LLC, Redmond, WA (US)

(72) Inventors: Austin S. Lee, Seattle, WA (US); Anthony James Ambrus, Seattle, WA (US); Mathew Julian Lamb, Seattle, WA (US); Sophie Stellmach, Kirkland, WA (US); Keiichi Matsuda, Chigasaki (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/087,435

(22) Filed: Nov. 2, 2020

(51) Int. Cl.
| | |
|---|---|
| *G09G 5/37* | (2006.01) |
| *G06F 3/01* | (2006.01) |
| *H04S 7/00* | (2006.01) |
| *G02B 27/01* | (2006.01) |
| *G06T 11/00* | (2006.01) |
| *G06V 20/10* | (2022.01) |

(52) U.S. Cl.
CPC ........... *G09G 5/37* (2013.01); *G02B 27/0172* (2013.01); *G06F 3/017* (2013.01); *G06T 11/00* (2013.01); *G06V 20/10* (2022.01); *H04S 7/303* (2013.01); *G02B 2027/0141* (2013.01); *G09G 2354/00* (2013.01); *H04S 2400/11* (2013.01)

(58) Field of Classification Search
None
See application file for complete search history.

(56) References Cited

U.S. PATENT DOCUMENTS

| | | | | |
|---|---|---|---|---|
| 11,030,788 | B2 * | 6/2021 | Grant | G06F 3/012 |
| 2009/0318224 | A1 * | 12/2009 | Ealey | A63F 13/85 |
| | | | | 463/31 |
| 2012/0313775 | A1 | 12/2012 | Davis | |
| 2013/0335405 | A1 * | 12/2013 | Scavezze | A63F 13/61 |
| | | | | 345/419 |
| 2014/0002491 | A1 * | 1/2014 | Lamb | G06F 3/012 |
| | | | | 345/633 |
| 2015/0317831 | A1 | 11/2015 | Ebstyne et al. | |
| 2017/0069143 | A1 | 3/2017 | Salter et al. | |
| 2017/0309079 | A1 * | 10/2017 | Naples | G06F 3/013 |
| 2019/0332400 | A1 | 10/2019 | Spoor et al. | |
| 2020/0213680 | A1 * | 7/2020 | Ingel | H04N 21/233 |
| 2020/0342979 | A1 * | 10/2020 | Sadowsky | A61B 5/0013 |
| 2021/0048680 | A1 * | 2/2021 | Deliz Centeno | G02B 27/0172 |
| 2021/0158591 | A1 * | 5/2021 | Kuribayashi | G06T 13/40 |

OTHER PUBLICATIONS

"International Search Report and Written Opinion Issued in PCT Application No. PCT/US21/048953", dated Dec. 22, 2021, 11 Pages.

* cited by examiner

*Primary Examiner* — Saptarshi Mazumder
(74) *Attorney, Agent, or Firm* — Alleman Hall Creasman & Tuttle LLP

(57) ABSTRACT

Examples are disclosed herein relating to displaying a virtual assistant. One example provides an augmented reality display device comprising a see-through display, a logic subsystem, and a storage subsystem storing instructions executable by the logic subsystem to display via the see-through display a virtual assistant associated with a location in a real-world environment, detect a change in a field of view of the see-through display, and when the virtual assistant is out of the field of view of the see-through display after the change in the field of view, display the virtual assistant in a virtual window on the see-through display.

20 Claims, 7 Drawing Sheets

DISPLAY OF VIRTUAL ASSISTANT IN AUGMENTED REALITY

BACKGROUND

Virtual assistants provide a wide variety of services for users of computing devices. Virtual assistants may be integrated into many types of platforms, such as mobile devices, desktop and laptop computers, and "headless devices" (devices configured to operate without a display or keyboard). Through a virtual assistant, users may query for information, control connected devices and media playback, and manage application and/or device tasks via verbal commands, among other tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to displaying a virtual assistant in an augmented reality environment. One example provides an augmented reality display device comprising a see-through display, a logic subsystem, and a storage subsystem storing instructions executable by the logic subsystem to display via the see-through display a virtual assistant associated with a location in a real-world environment, detect a change in a field of view of the see-through display, and when the virtual assistant is out of the field of view of the see-through display after the change in the field of view, display the virtual assistant in a virtual window on the see-through display.

DETAILED DESCRIPTION

Virtual assistants can be implemented in various ways on different types of computing devices. For example, on headless devices, a virtual assistant may simply be represented as a disembodied voice, potentially in combination with subtle visual signals, such as light colors or patterns displayed by lights on the device body, that convey a current state of the assistant (passively listening, actively listening, processing input, etc.). On other types of devices, a virtual assistant may be presented visually on a display screen, such as via an animated character. The term "virtual assistant" is used herein to represent any presentation of a virtual assistant program to a user, whether as a disembodied voice, an animated "agent," or other representation. Depending upon the input capabilities provided by a device, users may be able to communicate with a virtual assistant via any of a number of input modes, including text chat, graphical user interface (GUI) controls, gesture, and/or voice.

Displaying a virtual assistant agent in an augmented reality environment may pose challenges. For example, a virtual assistant presented as an animation may be displayed in a particular location in an augmented reality environment, such as standing on the surface of a real table or other object in the environment. As a user moves about in the virtual embodiment, the virtual assistant may pass out of view at times. In such situations, transitioning the virtual assistant back into view for interactions may be disruptive to a user experience. Presenting a virtual assistant as a disembodied voice may avoid such issues, but also may limit the connection a user feels with the virtual assistant. Further, presenting the virtual assistant persistently at a particular location on the display, as opposed to being positioned at a particular location in the real-world background, may detract from the feel of an immersive augmented reality experience.

Accordingly, examples are disclosed that relate to displaying a virtual assistant in an augmented reality environment in manners that may address such issues. The disclosed examples may enable users to interact with a virtual assistant in a more intuitive manner, and may help users to establish stronger connections with the virtual assistant.

Figure 1:
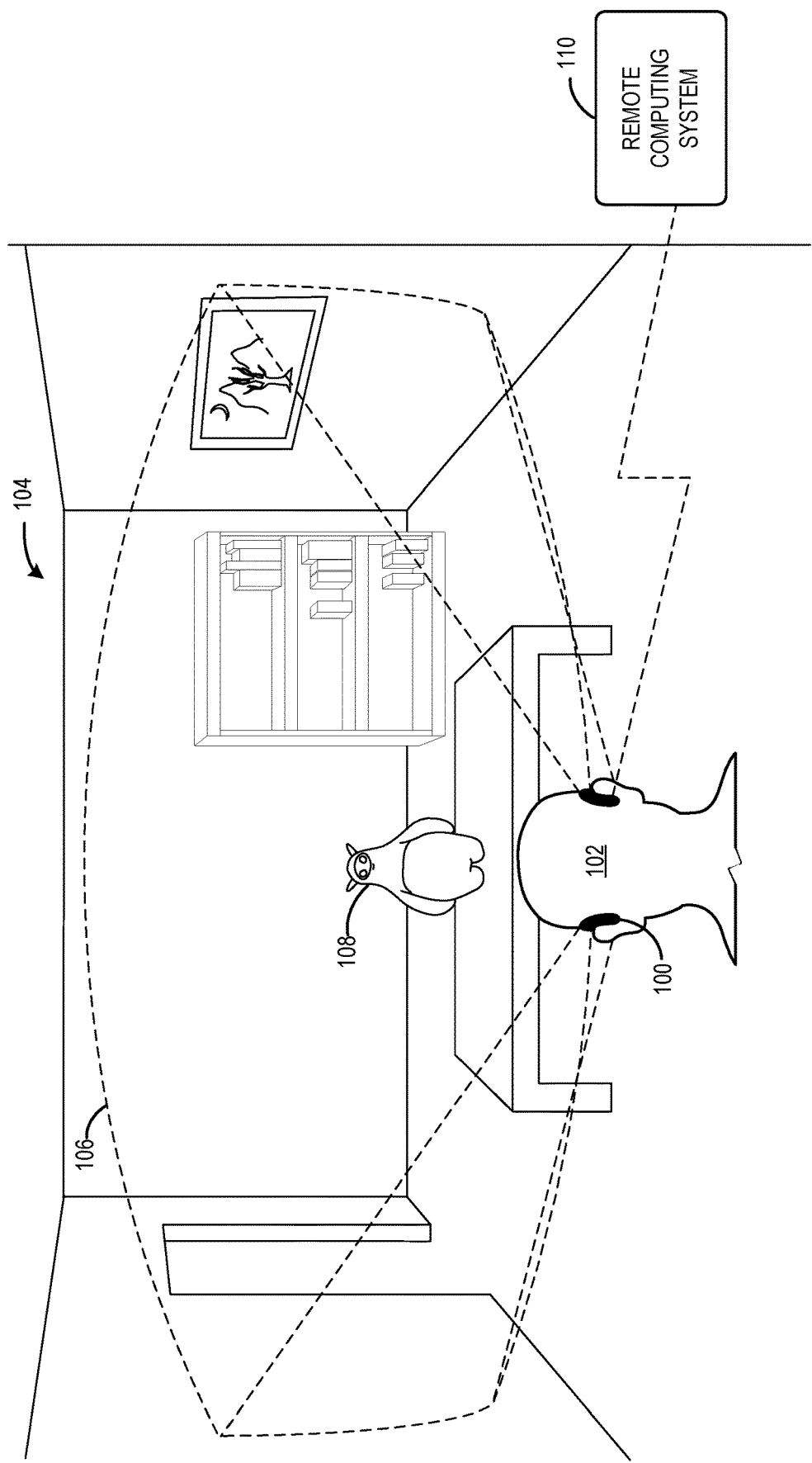
FIG. 1 shows an example use scenario in which an augmented reality device displays a virtual assistant.

FIG. 1 shows an example use scenario in which an augmented reality device 100 in the form of a head-mounted display device is worn by a user 102 viewing a real-world environment 104. Augmented reality display device 100 includes a see-through display that is configured to display virtual imagery within a field of view 106. Here, a virtual assistant 108 is presented as an animated character displayed within the field of view 106. A user may interact with the virtual assistant 108 and other displayed virtual objects via any suitable user input mode, including but not limited to speech, gesture, and eye gaze.

The augmented reality display device 100 may include one or more outward-facing image sensors configured to acquire image data of the real-world environment 104. Examples of such image sensors include, but are not limited to, depth sensors (e.g. time-of-flight camera(s), structured light camera(s), and/or stereo camera arrangements), and two-dimensional image sensors (e.g. RGB, grayscale and/or infrared sensors). Such image sensor(s) may be configured to detect images in visible, infrared and/or other suitable wavelength range(s). The acquired image data may be utilized to obtain a representation of the real-world environment 104 for use in displaying and positioning virtual objects appropriately. Although the augmented reality display device 100 is shown here as a head-mounted display device, it will be understood that an augmented reality display device may take any other suitable form, such as a mobile computing device (e.g. a smartphone or tablet).

The augmented reality display device 100 may obtain virtual content for display from any suitable source, such as from a remote device over a network, and/or from local storage. FIG. 1 shows a remote computing system 110 in communication with the augmented reality display device 100. In some examples, logic for controlling and presenting the virtual assistant may reside at least partially on the remote computing system 110. Remote computing system 110 may represent any suitable remote computing system, including one or more servers in a cloud computing system.

Some virtual objects may be displayed as "world-locked," such that they appear to be in a same reference frame as the real-world background as the device moves through a use environment. Likewise, some virtual objects may be displayed as "device-locked," such that the displayed location is fixed relative to the see-through display as the see-through display moves relative to the real-world background view. In either case, the term "locked" does not indicate that the objects are necessarily fixed in position, but rather indicates a reference frame in which the objects are displayed.

Figure 2:
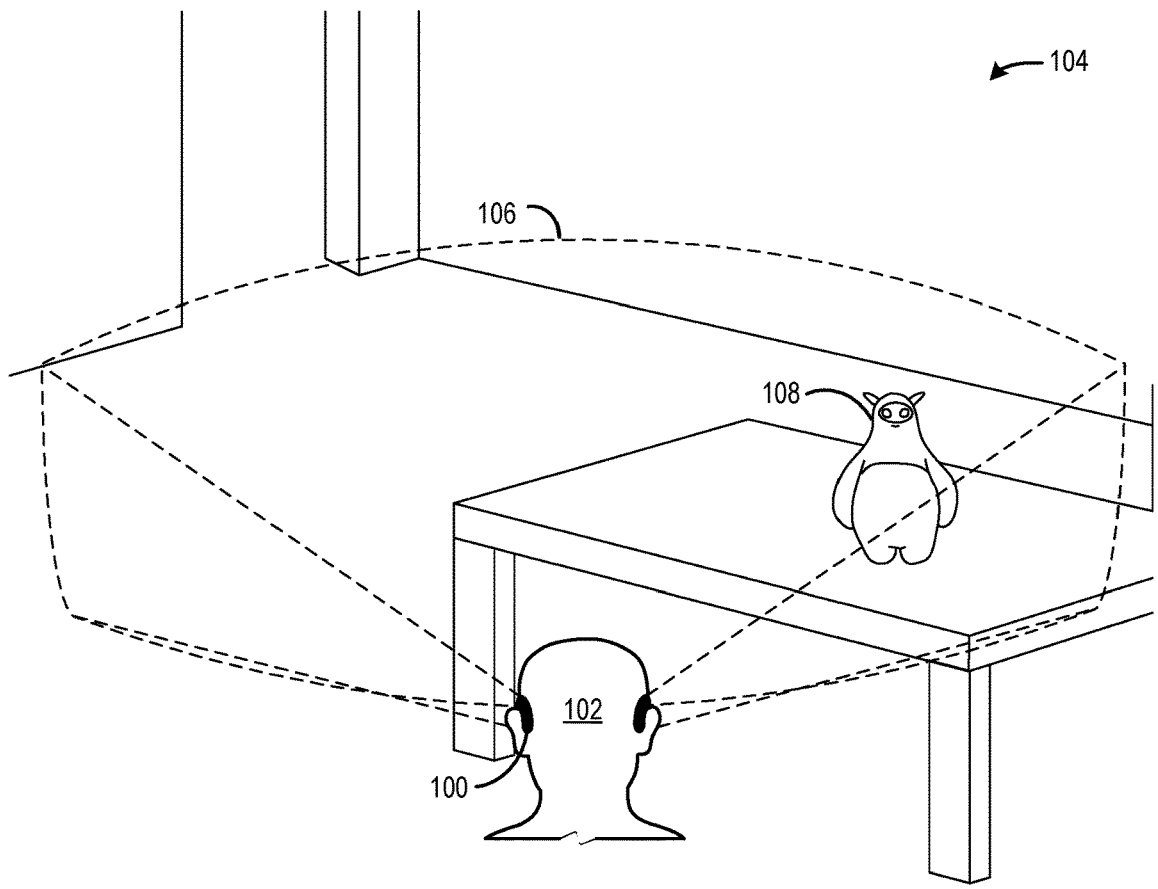
FIG. 2 shows a change in a field of view of the see-through display of the augmented reality display device of FIG. 1.

In FIG. 1, the virtual assistant 108 is displayed as standing on a real-world table in a world-locked view. Referring next to FIG. 2, when the field of view 106 of the augmented reality display device 100 changes due to user motion, the location at which the virtual assistant 108 is displayed on the see-through display device is adjusted to maintain the association of the virtual assistant 108 with the real-world location on the tabletop.

Figure 3:
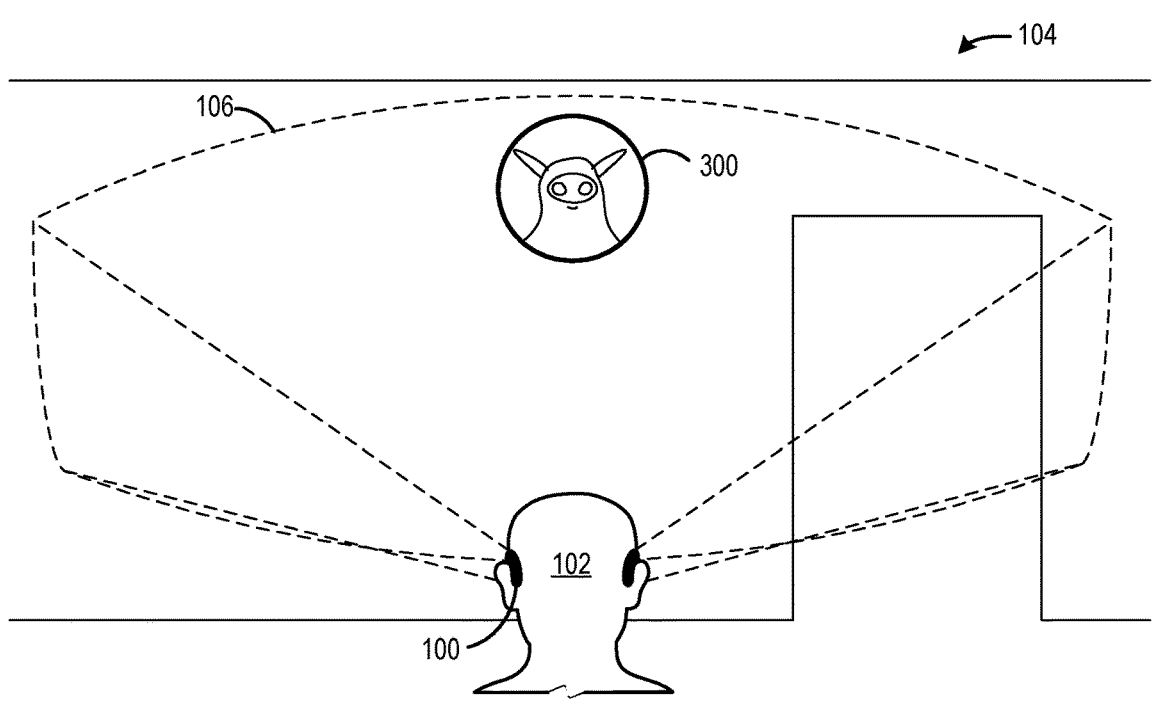
FIG. 3 shows an example in which the virtual assistant of FIG. 1 is outside of a field of view of the see-through display and is displayed in a virtual window.

In some instances, user motion may move the virtual assistant 108 out of the field of view 106. Having the virtual assistant 108 remain out of the field of view in such instances may provide a lesser level of interactivity with the virtual assistant 108. As such, FIG. 3 shows the virtual assistant 108 displayed in an example virtual window 300 that appears as a transitional state when the virtual assistant 108 is out of the field of view 106 of the display device. The virtual window 300, instead of being world-locked, is display-locked, in that it is associated with a location on the see-through display and stays in that location while the see-through display is moved relative to the real-world background. Here, the world-locked virtual assistant 108 remains logically in the same location as shown in FIG. 1 and FIG. 2, while the virtual window 300 allows the user 102 to still observe and interact with the virtual assistant. The representation of the virtual assistant in window 300 may provide full functionality of and interactivity with the virtual assistant 108, using the same input and output mechanisms used with the virtual assistant 108. This provides the user continuous engagement with the virtual assistant program even when the virtual assistant 108 is out of view, and thereby assists the user to perform tasks on the computing device by maintaining a continued human-machine interaction while the full embodiment of the virtual assistant 108 is out of view.

Display of the virtual window 300 may be triggered based upon any suitable factors. In some examples, display of the virtual window 300 may be initiated based upon a threshold condition being met. For example, the user may turn or reposition their body such that the virtual assistant 108 is past a threshold degree of rotation and/or distance from the field of view 106. As another example, the virtual window 300 may be displayed when the virtual assistant 108 is out of view for a threshold time. In any of such examples, the augmented reality display device 100 may cease display of the virtual window 300 when the threshold condition is no longer met, based upon a different threshold condition, and/or based upon any other suitable conditions.

In some examples, the virtual assistant may initially appear in the virtual window 300, instead of in the fully embodied form at 108, based upon an environmental context of the augmented reality display device. For example, if a user is using the augmented reality display device while riding in a moving vehicle, the augmented reality display device may automatically display the virtual window when the virtual assistant appears. In yet other examples, the virtual assistant may initially appear in the virtual window 300 in response to a user input or setting.

To enhance the effect of the virtual assistant 108 being located outside the field of view 106 of the augmented reality display device 100, spatial audio signals may be computed and output for the virtual assistant based on a location of the virtual assistant 108 compared to the field of view 106. As such, in FIG. 3, the augmented reality display device 100 may output audio signals for the virtual assistant 108 as if audio were originating at the location at which the virtual assistant 108 was last seen by the user. Such spatial audio may enhance the impression that the virtual assistant 108 is still located on the table that is out of view.

Figure 4:
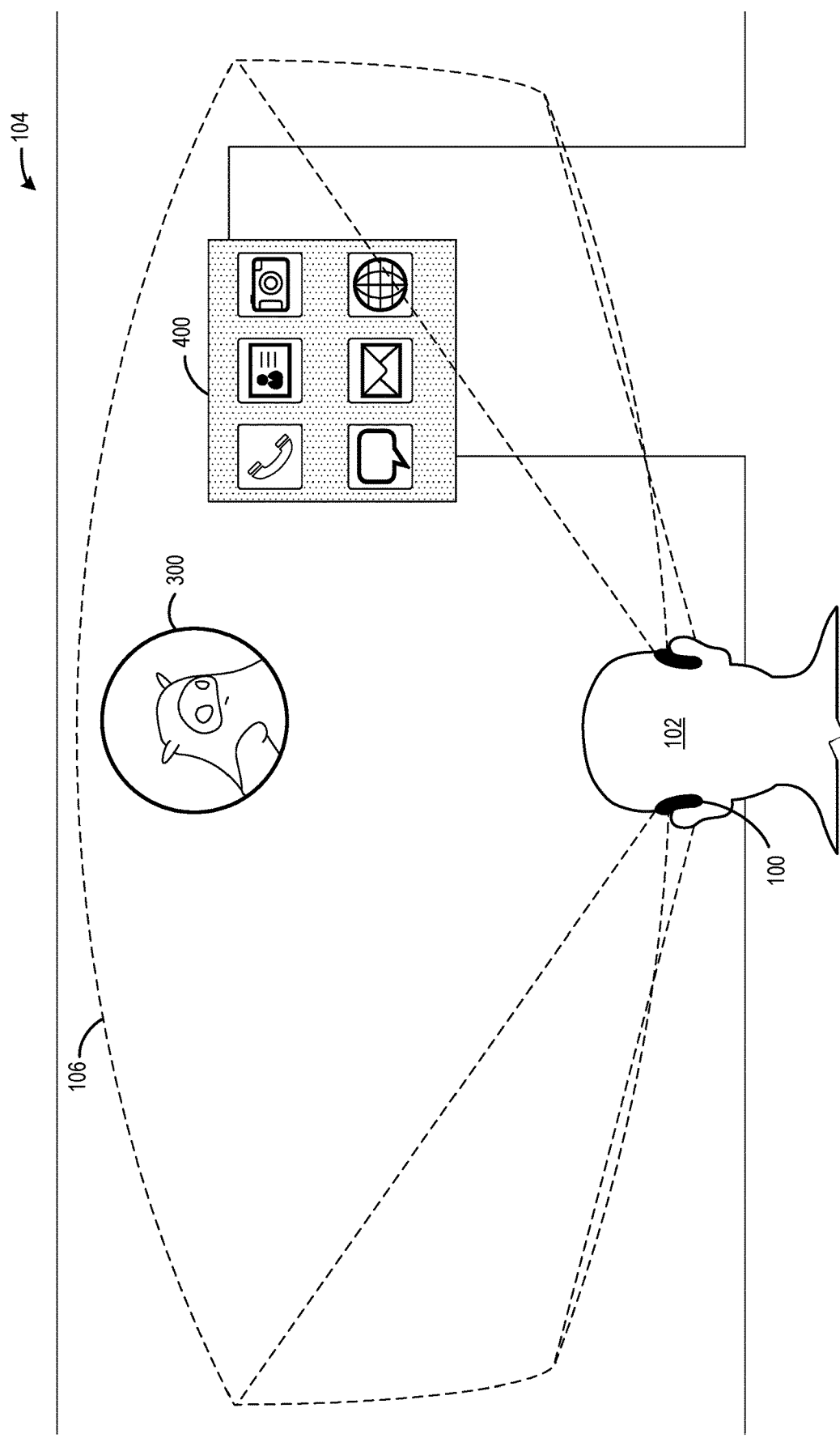
FIG. 4 shows an example in which the virtual assistant in the virtual window is animated as performing a gesture in response to a user query.

FIG. 4 shows an example of an animated gesture performed by the virtual assistant 108 within the virtual window 300 in response to a user query. The illustrated gesture may be in response to a user query requesting a location of an object, such as an icon for an application residing on the augmented reality display device 100, for example. In response, the virtual assistant 108 may be animated to move an apparent gaze direction toward the location of the object, in this case to a virtual menu 400 displaying a plurality of applications, one of which is the application requested. The virtual assistant 108 may further be animated by displaying an appendage of the virtual assistant 108 as pointing to the location of the object. Such a virtual assistant gesture also may be used to indicate the location of a real-world object.

As mentioned above, a virtual assistant may be animated in a manner configured to help a user to feel more comfortable or more connected to the virtual assistant. To foster this effect, the virtual assistant may learn characteristics of a user over time and adapt its behavior to one or more such characteristics. Upon use of the augmented reality display device and the virtual assistant for the first time by a new user, the virtual assistant may initially be presented with default characteristics. Default characteristics may include, as examples, gestures, appearances, sounds, and facial expressions. Over time, sensor data that captures user characteristics may be acquired and analyzed, and the default characteristics may be modified based upon the analyzed user characteristics. Examples of such sensor data include image data from an outward-facing image sensor capturing user hand and arm gestures, gaze detection data from a user-facing image sensor that captures user eye gestures, audio data from a microphone capturing a voice of a user, inertial motion data from an inertial motion sensing system capturing user motions, and location data from a global positioning system (GPS) sensor. Based on such sensor data, the augmented reality display device may be configured to determine user characteristics corresponding to the default characteristics, and store user-adapted characteristics to be used to enhance a presentation of the virtual assistant. As a more specific example, computer vision-based classification techniques may be used to identify user gestures, e.g. by using techniques such as skeletal tracking. Parameters of the identified gestures (e.g. hand or arm travel paths during gestures, and/or facial motions and/or poses) may be stored and updated over time, and the parameters may be applied to control virtual assistant motions and poses to make the virtual assistant appear more familiar to a user.

Figure 5:
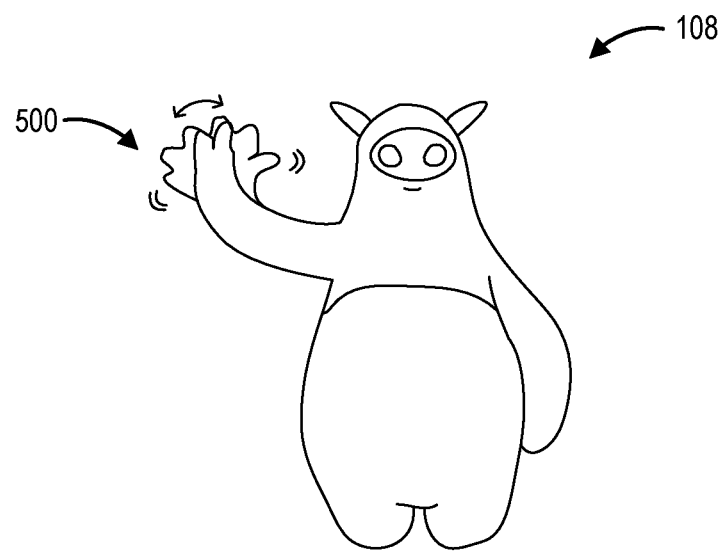
FIG. 5 shows an example default animation for the virtual assistant.
Figure 6:
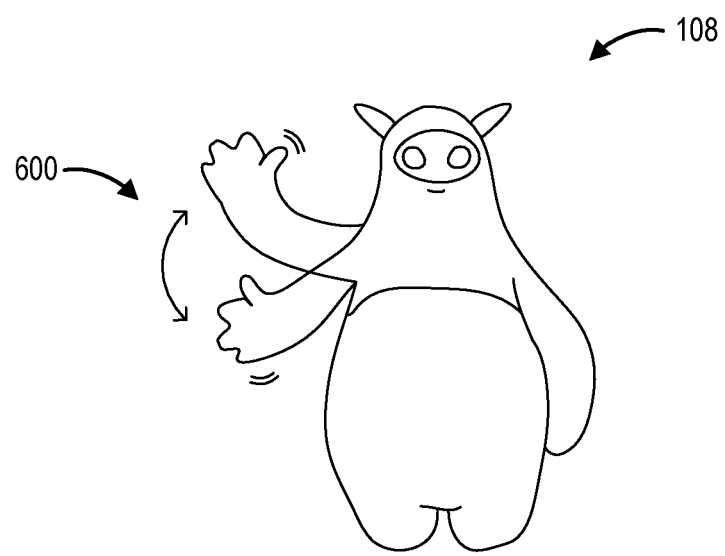
FIG. 6 shows an example modified animation for the virtual assistant that is modified based on a learned user characteristic.

FIGS. 5 and 6 show an example of adapting a virtual assistant gesture based upon user motion patterns. FIG. 5 shows the virtual assistant 108 performing a default animation 500 of a greeting gesture by waving its hand. Over time, the augmented reality display device may learn parameters of the user's own waving motion. The learned parameters then may be applied to the animation of the virtual assistant 108 so that the virtual assistant moves in a manner similar to that of the user. FIG. 6 shows an example of the virtual assistant 108 performing a modified animation 600 based on learned user motion patterns. In other examples, the virtual assistant may also adapt to the user's facial expressions, or adapt synthesized speech outputs (tone, speed, etc.) to match that of the user. Such modified characteristics may help the virtual assistant to behave in a more natural, familiar manner compared to existing virtual assistants and allow a user to feel more of a connection to the virtual assistant.

Behaviors of the virtual assistant also may be animated based on a learned characteristic of a use environment. As an example, the virtual assistant may be animated to spawn into view in a manner based upon a recognized object in the use environment. In such an example, an augmented reality display device may use image data from outward-facing image sensors to classify objects in the use environment via machine vision classification techniques (e.g. using neural networks such as convolutional neural networks). Such classification may be based on depth data, such as a surface reconstruction of the use environment derived from depth image data, and/or intensity image data. Examples of objects that can be classified include walls, floors, ceilings, doors, windows, shelves, cabinets, furniture such as tables and chairs, and objects such as plants, vases, pictures, monitors, and televisions. As one example, where a table is in a room and in a field of view, an augmented reality display device may be configured to spawn a virtual assistant on the table. To further embellish the presentation of the virtual assistant, the virtual assistant may be animated as interacting with the real-world surface or object in some manner, such as by walking or otherwise moving on the table after spawning.

Figure 7:
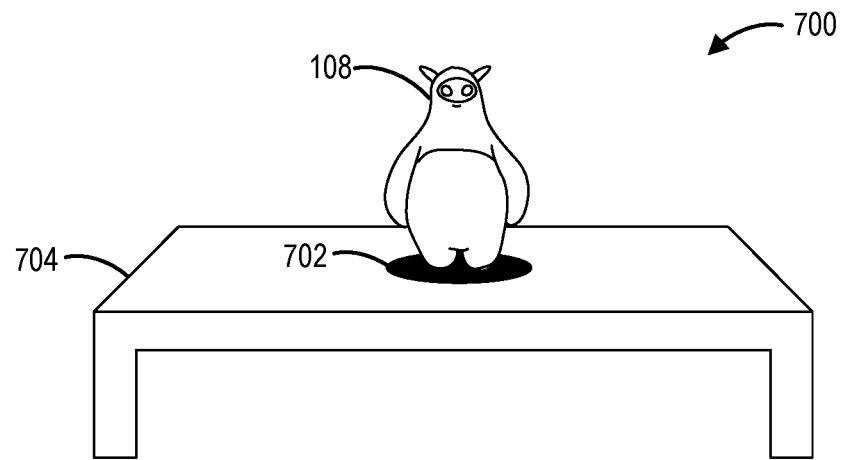
FIG. 7 shows an example default presentation of a virtual assistant.

FIG. 7 shows an example scenario 700 of a presentation of the virtual assistant 108 as spawning out of a virtual portal 702 on a real-world table 704. In this instance, the augmented reality display device detects the real-world table 704, and selects a spawning animation corresponding to a table. As another example, the virtual assistant may be presented as appearing from a virtual portal on a recognized wall, and then interacting with the wall, such as by climbing the wall. As other examples, the augmented reality display device may display the virtual assistant as appearing from behind or from within a real-world object, such as walking out from behind a television, or standing up from within a coffee mug.

Figure 8:
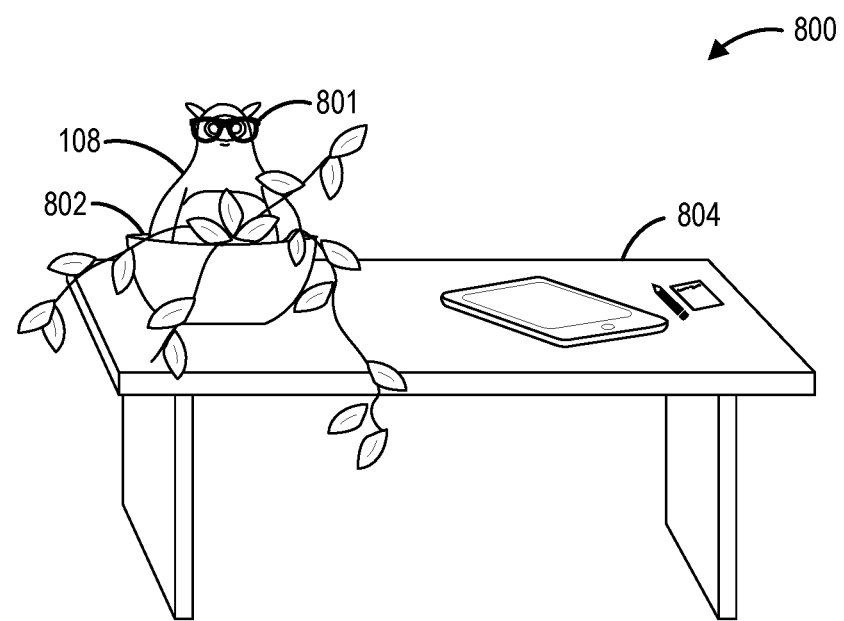
FIG. 8 shows an example presentation of the virtual assistant of FIG. 7 that is modified based on a learned environmental characteristic.

Other types of contextual information about a use environment than objects in an environment may be learned and then used to animate a virtual assistant. For example, objects in a room and/or user behaviors in a room may allow a room to be identified as an office, kitchen, living room, etc. As a more specific example, a room with a desk and a computer on the desk that is occupied regularly by a user during weekday hours may be recognized as an office. Alternatively or additionally, a user may designate the room as an office by user input. With this contextual information about the room, the presentation of the virtual assistant can be modified based upon the context. For example, the virtual assistant may be presented as wearing glasses when in the office, or wearing an apron and carrying kitchen gadgets when in the kitchen. FIG. 8 shows an example scenario 800 in which the virtual assistant 108 is presented as wearing glasses 801 based on a determination that the table 804 is an office table. The virtual assistant may be presented in any other suitable manner that is intended to fit a current environmental context of the augmented reality display device as it relates to location, room type, presence of objects and people, time of day, temperature, etc.

Learned characteristics about a use environment also can be used to modify a default animation. As one example, an augmented reality display device may be configured to display a virtual assistant as residing in a physical case for the augmented reality display device, and as crawling out from the inside of the case when summoned. However, upon learning more about the use environment, a different spawning behavior may be animated. For example, FIG. 8 shows an adaptation of the spawning of the virtual assistant of FIG. 7 based on contextual information learned from sensor data. In this example, the augmented reality display device has determined, based on past user behavior, that the user often summons the virtual assistant while in the office room with the real-world table 804 within view. The augmented reality display device may select the table 804 as a default location for the virtual assistant 108, and may further create a virtual home 802 for the virtual assistant 108 on the table 804, in this case a plant basin from which the virtual assistant 108 emerges. Further, the appearance of the default location and/or virtual home may be modified over time. As the virtual assistant 108 "settles in" and time passes, the virtual home 802 may be further embellished with virtual decorations or accessories for the virtual assistant 108, furthering the effect of the table 804 being established as the virtual assistant's home. The impression of the virtual assistant 108 customizing its own home within the user's environment may further contribute to the effect of a more lifelike, humanized character in order to better establish a connection with the user. It will be understood that any of the modifications that may be made to the virtual assistant and/or virtual objects associated with the virtual assistant (virtual home or accessories) may also be made based on user designation.

Figure 9:
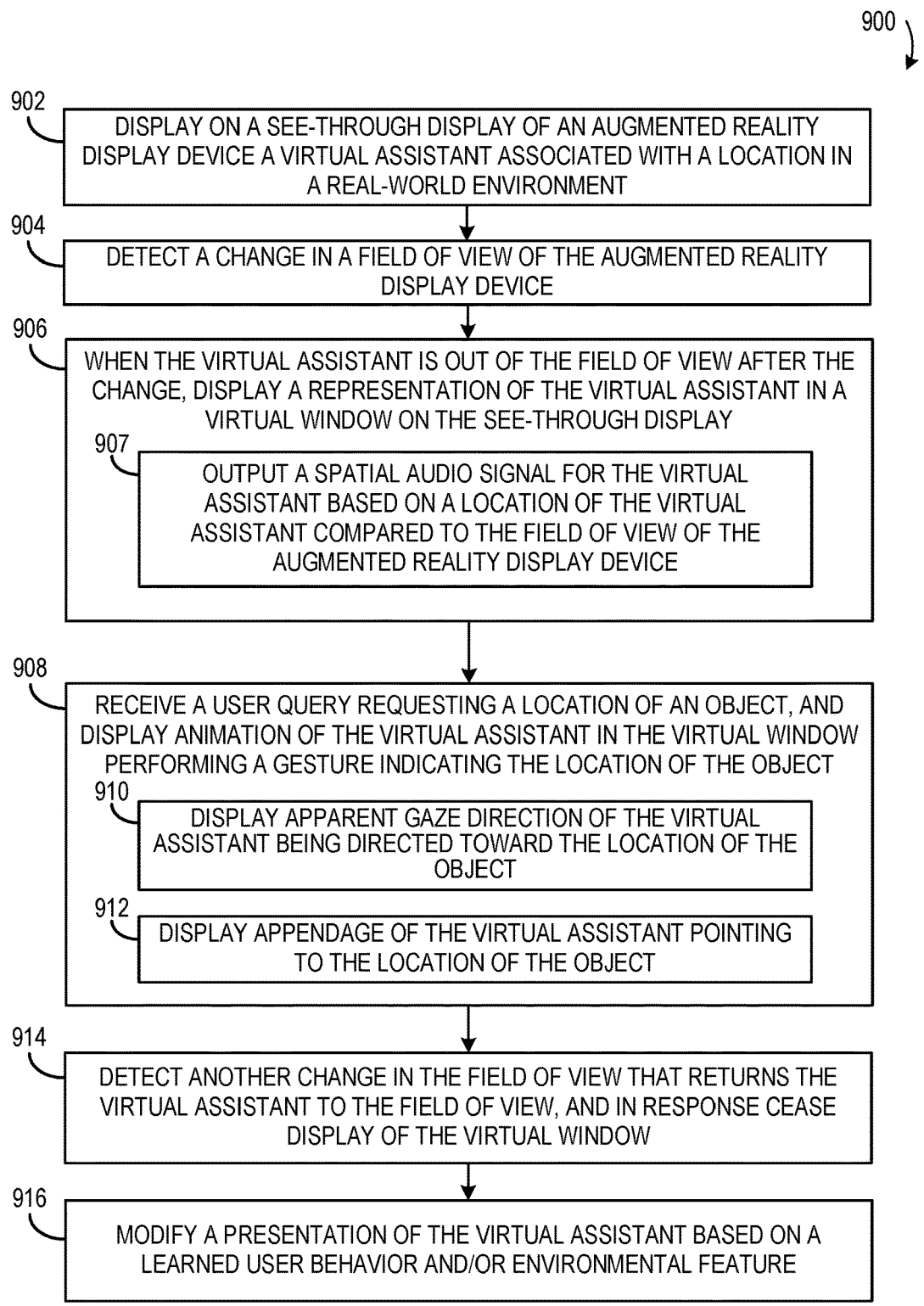
FIG. 9 is a flow diagram depicting an example method of displaying a virtual assistant.

FIG. 9 shows an example method 900 of displaying a virtual assistant. Method 900 includes, at 902, displaying on a see-through display of an augmented reality display device (e.g. augmented reality display device 100) a virtual assistant associated with a location in a real-world environment, such that the virtual assistant is world-locked. Method 900 further includes, at 904, detecting a change in a field of view of the see-through display of the augmented reality display device 100. When the virtual assistant is determined to be out of the field of view after the change, method 900 comprises, at 906, displaying a representation of the virtual assistant in a virtual window on the see-through display. The virtual window may be associated with a location on the see-through display, such that its position is fixed relative to the see-through display (device-locked). In some examples, method 900 may include, at 907, outputting a spatial audio signal for the virtual assistant based on a location of the virtual assistant compared to the field of view of the see-through display. Spatial audio may help to enhance the effect of the virtual assistant being located at a particular location outside of the field of view.

Method 900 further includes, at 908, receiving a user query requesting a location of an object, and displaying an animation of the virtual assistant in the virtual window performing a gesture indicating the location of the object. The user query may request the location of either a virtual object or a real-world object. Displaying the animation may include, at 910, displaying an apparent gaze direction of the virtual assistant being directed toward the location of the object, and/or at 912, and/or displaying an appendage of the virtual assistant pointing to the location of the object.

Method 900 further includes, at 914, detecting another change in the field of view that returns the virtual assistant to the field of view, and in response ceasing display of the virtual window. As described above, the augmented reality display device may cease display of the virtual window when a threshold condition is no longer met and/or based upon any other suitable condition.

Method 900 further may include, at 916, modifying a presentation of the virtual assistant based on a learned user behavior and/or environmental feature. Learned user behaviors may include gestures, facial expressions, and voice characteristics, as examples. Learned environmental features may include objects in a room and room identities, as examples. In some examples, environmental features may be learned by applying object recognition methods to image data capturing the use environment. Such adaptations may allow the virtual assistant to appear more human-like and familiar, and thereby help users to establish a connection with the virtual assistant.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
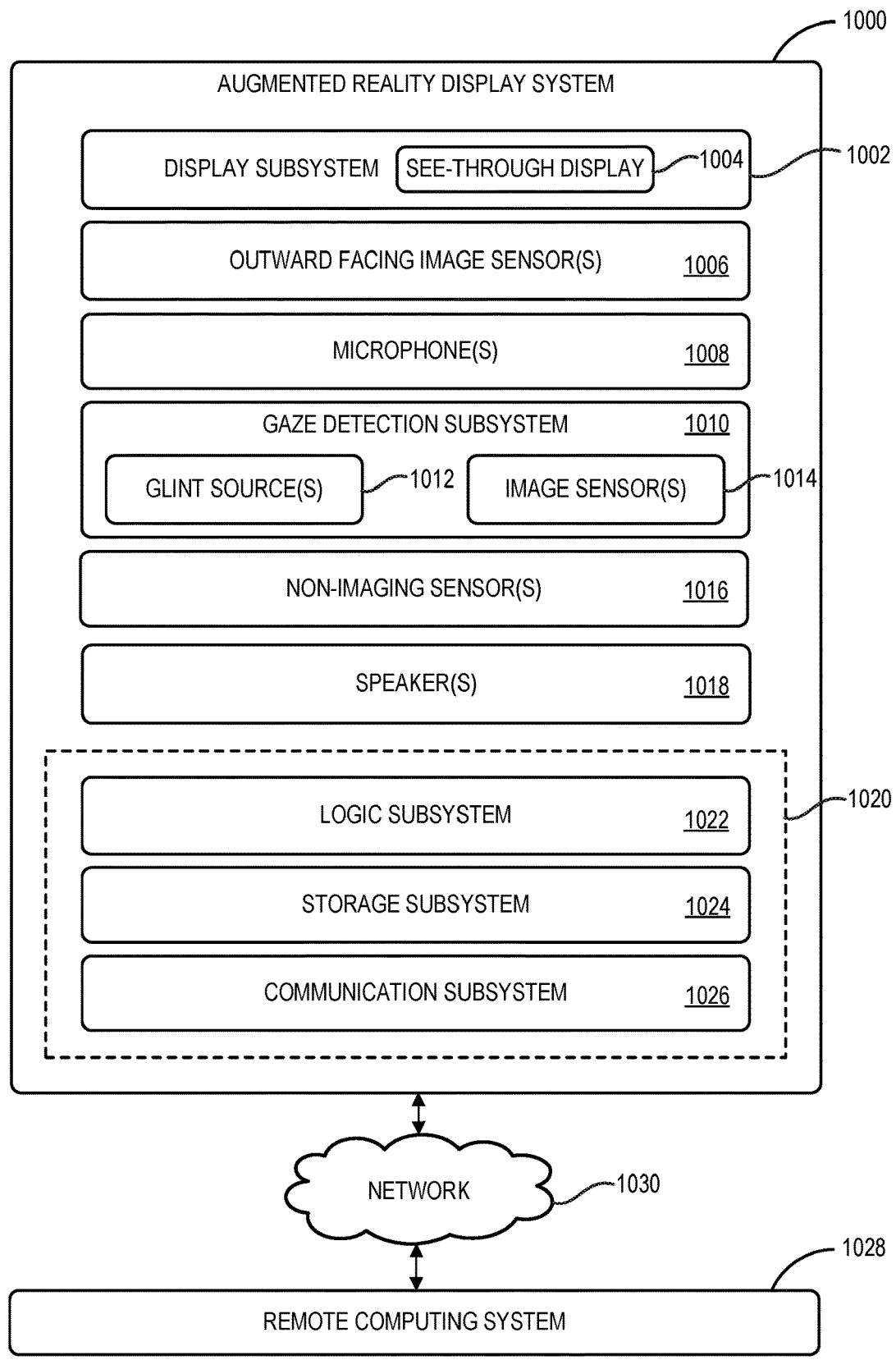
FIG. 10 shows an example augmented reality computing system.

FIG. 10 shows a block diagram of an example augmented reality display system 1000. The display system 1000 includes a display subsystem 1002 configured to produce images for display via a see-through display 1004. The see-through display comprises one or more waveguides, prisms, and/or other suitable optics to combine displayed imagery with a view of a real-world background. In other examples, the augmented reality display device may be configured to augment video from a camera stream for presentation to a user, rather than optically combining virtual imagery with a real-world view. The augmented reality display system 1000 further includes one or more outward-facing image sensors 1006 configured to acquire images of a real-world environment, and may include one or more microphones 1008 configured to detect sounds, such as voice commands from a user or ambient sounds. The outward-facing image sensors 1006 may include one or more depth sensor(s) and/or one or more intensity image sensor(s) (e.g. RGB image sensors).

The augmented reality display system 1000 further may include a gaze detection subsystem 1010 configured to detect a gaze of a user. The gaze detection subsystem 1010 may be configured to determine gaze directions of each of a user's eyes in any suitable manner. In this example, the gaze detection subsystem 1010 comprises one or more glint sources 1012, such as infrared light sources configured to cause glints of light to reflect from the each eye of a user, and one or more image sensor(s) 1014 configured to capture an image of each eyeball of the user. Images of the locations of glints and the locations of the user's pupils may be used to determine a direction in which to project gaze lines from the user's eyes. Further, a location at which gaze lines projected from the user's eyes intersect the environment may be used to determine an object at which the user is gazing (e.g. a displayed virtual object and/or real background object). The gaze detection subsystem 1010 may have any suitable number and arrangement of light sources and image sensors. In other examples, the gaze detection subsystem 1010 may be omitted.

The augmented reality display system 1000 also may include additional sensors. For example, the augmented reality display system 1000 may include non-imaging sensor(s) 1016, examples of which may include an accelerometer, a gyroscopic sensor, a global positioning system (GPS) sensor, and an inertial measurement unit (IMU). Motion sensors, as well as the microphone(s) 1008 and the gaze detection subsystem 1010, may be employed as user input devices, such that a user may interact with the augmented reality display system 1000 via gestures of the eye, neck and/or head, and/or via verbal commands. It will be understood that sensors illustrated in FIG. 10 are shown for the purpose of example and are not intended to be limiting in any manner, as any other suitable sensors and/or combination of sensors may be utilized. The augmented reality display system 1000 further may include one or more speaker(s) 1018, for example to provide audio outputs to a user for user interactions.

The augmented reality display system 1000 further includes a controller 1020 having a logic subsystem 1022 and a storage subsystem 1024 in communication with the sensors, the gaze detection subsystem 1010, the display subsystem 1004, and/or other components. The storage subsystem 1024 comprises instructions stored thereon that are executable by the logic subsystem 1022 to perform the various methods described herein, among other tasks.

The logic subsystem 1022 includes one or more physical devices configured to execute instructions. For example, the logic subsystem 1022 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1022 may include one or more processors configured to execute software instructions. Additionally or alternatively, the logic subsystem 1022 may include one or more hardware or firmware logic subsystems configured to execute hardware or firmware instructions. Processors of the logic subsystem 1022 may be single-core or multi-core, and the instructions executed thereon may be configured for sequential, parallel, and/or distributed processing. Individual components of the logic subsystem 1022 optionally may be distributed among two or more separate devices, which may be remotely located and/or configured for coordinated processing. Aspects of the logic subsystem 1022 may be virtualized and executed by remotely accessible, networked computing devices configured in a cloud-computing configuration.

The storage subsystem 1024 includes one or more physical devices configured to hold instructions executable by the logic subsystem 1022 to implement the methods and processes described herein. When such methods and processes are implemented, the state of the storage subsystem 1024 may be transformed—e.g., to hold different data.

The storage subsystem 1024 may include removable and/or built-in devices. The storage subsystem 1024 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 1024 may include volatile, nonvolatile, dynamic, static, read/write, read-only, random-access, sequential-access, location-addressable, file-addressable, and/or content-addressable devices.

It will be appreciated that the storage subsystem 1024 includes one or more physical devices. However, aspects of the instructions described herein alternatively may be propagated by a communication medium (e.g., an electromagnetic signal, an optical signal, etc.), as opposed to being stored on a storage device.

Aspects of the logic subsystem 1022 and the storage subsystem 1024 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The display subsystem 1004 may be used to present a visual representation of data held by the storage subsystem 1024. This visual representation may take the form of three-dimensional virtual objects, a graphical user interface (GUI) comprising a menu and/or other graphical user interface elements. As the herein described methods and processes change the data held by the storage subsystem 1024, and thus transform the state of the storage subsystem, the state of see-through the display subsystem 1004 may likewise be transformed to visually represent changes in the underlying data. The display subsystem 1004 may include one or more display devices utilizing virtually any type of technology. Such display devices may be combined with the logic subsystem 1022 and/or the storage subsystem 1024 in a shared enclosure, or such display devices may be peripheral display devices.

The communication subsystem 1026 may be configured to communicatively couple the augmented reality display system 1000 with one or more other computing devices. The communication subsystem 1026 may include wired and/or wireless communication devices compatible with one or more different communication protocols. As non-limiting examples, the communication subsystem 1026 may be configured for communication via a wireless telephone network, or a wired or wireless local- or wide-area network. In some embodiments, the communication subsystem 1026 may allow the augmented reality display system 1000 to send and/or receive data to and/or from other devices, illustrated as remote computing system 1028, via a network 1030 such as the Internet.

It will be appreciated that the depicted augmented reality display system 1000 is described for the purpose of example, and is not meant to be limiting. It is to be further understood that the augmented reality display system 1000 may include additional and/or alternative sensors, cameras, microphones, input devices, output devices, etc. than those shown without departing from the scope of this disclosure. For example, the display system 1000 may be implemented as a virtual reality display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the augmented reality display system 1000 or other suitable display system, and/or on a computing system in communication with the augmented reality display system 1000. For example, the augmented reality display system 1000 may be in communication with a remote computing system 1028 via a network 1030, where at least some logic for operating the virtual assistant resides on the remote computing system 1028.

Another example provides an augmented reality display device comprising a see-through display, a logic subsystem, and a storage subsystem storing instructions executable by the logic subsystem to display via the see-through display a virtual assistant associated with a location in a real-world environment, detect a change in a field of view of the see-through display, and when the virtual assistant is out of the field of view of the see-through display after the change in the field of view, display the virtual assistant in a virtual window on the see-through display. The instructions may additionally or alternatively be executable to receive a user query requesting a location of an object, and display an animation of the virtual assistant in the virtual window performing a gesture indicating the location of the object. The instructions may additionally or alternatively be executable to display the animation by displaying an apparent gaze direction of the virtual assistant being directed toward the location of the object. The instructions may additionally or alternatively be executable to display the animation by displaying an appendage of the virtual assistant pointing to the location of the object. The instructions may additionally or alternatively be further executable to detect another change in the field of view of the see-through display that returns the virtual assistant to the field of view of the see-through display, and in response cease display of the virtual window. The instructions may additionally or alternatively be further executable to modify a presentation of the virtual assistant based on a learned environmental feature of the real-world environment. The instructions may additionally or alternatively be further executable to receive image data of the real-world environment, and learn the learned environmental feature based on object recognition using the image data. The instructions may additionally or alternatively be executable to display an animation of the virtual assistant based on one or more of a user gesture and a facial expression of the user. The instructions may additionally or alternatively be further executable to generate a spatial audio signal for the virtual assistant based on a location of the virtual assistant compared to the field of view of the see-through display device.

Another example provides, on an augmented reality display device, a method comprising displaying on a see-through display of the augmented reality display device a virtual assistant associated with a location in a real-world environment, detecting a change in a field of view of the see-through display, and when the virtual assistant is out of the field of view of the see-through display after the change, displaying the virtual assistant in a virtual window associated with a location on the see-through display. The method may additionally or alternatively include receiving a user query requesting a location of an object, and displaying an animation of the virtual assistant in the virtual window performing a gesture indicating the location of the object. The method may additionally or alternatively include detecting another change in the field of view of the see-through display that returns the virtual assistant to the field of view of the see-through display, and in response ceasing display of the virtual window. The method may additionally or alternatively include modifying a presentation of the virtual assistant based on a learned environmental feature of the real-world environment. The method may additionally or alternatively include receiving image data of the real-world environment, and learning the learned environmental feature based on object recognition using the image data. The method may additionally or alternatively include displaying the virtual assistant in the virtual window based on a use context of the augmented reality display device.

Another example provides an augmented reality display device comprising a see-through display through which a field of view of a real-world environment is viewable, a logic subsystem, and a storage subsystem storing instructions executable by the logic subsystem to display a virtual assistant associated with a location in the real-world environment, display a default animation of the virtual assistant, receive sensor data capturing information on a characteristic of one or more of a user and a use environment of the augmented reality display device, and based upon the characteristic, display a modified animation of the virtual assistant. The instructions may additionally or alternatively be executable to display the modified animation of the virtual assistant based on a learned environmental feature of the real-world environment. The instructions may additionally or alternatively be executable to display the modified animation by displaying an accessory for the virtual assistant based on the learned environmental feature. The sensor data may additionally or alternatively include image data of the real-world environment, and the instructions may additionally or alternatively be executable to learn the learned environmental feature based on performing object recognition using the image data. The instructions may additionally or alternatively be executable to display the modified animation of the virtual assistant based on one or more of a user gesture and a facial expression of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An augmented reality display device comprising:
   a see-through display;
   a logic subsystem; and
   a storage subsystem storing instructions executable by the logic subsystem to
      display via the see-through display a virtual assistant associated with a location in a real-world environment,
      detect a change in a field of view of the see-through display,
      when the virtual assistant is out of the field of view of the see-through display after the change in the field of view, display the virtual assistant in a virtual window on the see-through display,
      detect another change in the field of view of the see-through display that returns the virtual assistant to the field of view of the see-through display, and
      in response, cease display of the virtual window.

2. The augmented reality display device of claim 1, wherein the instructions are further executable to receive a user query requesting a location of an object, and display an animation of the virtual assistant in the virtual window performing a gesture indicating the location of the object.

3. The augmented reality display device of claim 2, wherein the instructions are executable to display the animation by displaying an apparent gaze direction of the virtual assistant being directed toward the location of the object.

4. The augmented reality display device of claim 2, wherein the instructions are executable to display the animation by displaying an appendage of the virtual assistant pointing to the location of the object.

5. The augmented reality display device of claim 1, wherein the instructions are further executable to modify a presentation of the virtual assistant based on a learned environmental feature of the real-world environment.

6. The augmented reality display device of claim 5, wherein the instructions are executable to modify the presentation of the virtual assistant by animating the virtual assistant to spawn into view based on an object recognized in the real-world environment.

7. The augmented reality display device of claim 5, wherein the instructions are further executable to receive image data of the real-world environment, and learn the learned environmental feature based on object recognition using the image data.

8. The augmented reality display device of claim 1, wherein the instructions are executable to display an animation of the virtual assistant based on one or more of a user gesture and a facial expression of the user.

9. The augmented reality display device of claim 1, wherein the instructions are further executable to generate a spatial audio signal for the virtual assistant based on a location of the virtual assistant compared to the field of view of the see-through display device.

10. The augmented reality display device of claim 1, wherein the instructions are further executable to modify a speech output of the virtual assistant to match one or more of speed and tone of user speech based on learned user speech inputs over time.

11. On an augmented reality display device, a method comprising:
   displaying on a see-through display of the augmented reality display device a virtual assistant associated with a location in a real-world environment;
   detecting a change in a field of view of the see-through display;
   when the virtual assistant is out of the field of view of the see-through display after the change, displaying the virtual assistant in a virtual window associated with a location on the see-through display;
   detecting another change in the field of view of the see-through display that returns the virtual assistant to the field of view of the see-through display; and
   in response, ceasing display of the virtual window.

12. The method of claim 11, further comprising receiving a user query requesting a location of an object, and displaying an animation of the virtual assistant in the virtual window performing a gesture indicating the location of the object.

13. The method of claim 11, furthering comprising modifying a presentation of the virtual assistant based on a learned environmental feature of the real-world environment.

14. The method of claim 13, further comprising receiving image data of the real-world environment, and learning the learned environmental feature based on object recognition using the image data.

15. The method of claim 11, further comprising displaying the virtual assistant in the virtual window based on a use context of the augmented reality display device.

16. An augmented reality display device comprising:
a see-through display through which a field of view of a real-world environment is viewable;
a logic subsystem; and
a storage subsystem storing instructions executable by the logic subsystem to
display a virtual assistant associated with a location in the real-world environment,
based on a change in the field of view of the see-through display, when the virtual assistant is out of the field of view, display the virtual assistant in a virtual window on the see-through display, and when the virtual assistant returns to the field of view, cease display of the virtual window,
display a default animation of the virtual assistant,
receive sensor data capturing information on a characteristic of one or more of a user and a use environment of the augmented reality display device, and
based upon the characteristic, display a modified animation of the virtual assistant.

17. The augmented reality display device of claim 16, wherein the instructions are executable to display the modified animation of the virtual assistant based on a learned environmental feature of the real-world environment.

18. The augmented reality display device of claim 17, wherein the instructions are executable to display the modified animation by displaying an accessory for the virtual assistant based on the learned environmental feature.

19. The augmented reality display device of claim 17, wherein the sensor data comprises image data of the real-world environment, and wherein the instructions are executable to learn the learned environmental feature based on performing object recognition using the image data.

20. The augmented reality display device of claim 16, wherein the instructions are executable to display the modified animation of the virtual assistant based on one or more of a user gesture and a facial expression of the user.

* * * * *